United States Patent [19]

Powers et al.

[11] Patent Number: 4,882,131

[45] Date of Patent: Nov. 21, 1989

[54] PROCESS FOR RECOVERING TUNGSTEN FROM ORGANIC SOLUTIONS

[75] Inventors: John A. Powers, New Albany; James C. Patton; James N. Christini, both of Towanda, all of Pa.

[73] Assignee: GTE Products Corporation, Stamford, Conn.

[21] Appl. No.: 44,169

[22] Filed: Apr. 30, 1987

[51] Int. Cl.$^4$ .............................................. C01G 41/00
[52] U.S. Cl. ................................ 423/54; 75/101 BE; 423/658.5; 210/685; 210/688
[58] Field of Search ............................. 423/54, 658.5; 75/101 BE; 210/685, 688

[56] References Cited

U.S. PATENT DOCUMENTS

| | | | |
|---|---|---|---|
| 3,158,438 | 11/1964 | Kurtak | 423/54 |
| 3,804,941 | 4/1974 | Coad et al. | 423/54 |
| 4,175,109 | 11/1979 | Kim | 75/101 BE |
| 4,279,869 | 7/1981 | Coulson | 75/101 BE |
| 4,360,502 | 11/1982 | MacInnis et al. | 75/101 BE |
| 4,360,503 | 11/1982 | Boyer et al. | 75/101 BE |
| 4,369,165 | 1/1983 | Kim et al. | 75/101 BE |
| 4,374,099 | 2/1983 | Kim et al. | 75/101 BE |
| 4,551,314 | 11/1985 | Beckstead et al. | 423/658.5 |

FOREIGN PATENT DOCUMENTS

| | | | |
|---|---|---|---|
| 651304 | 10/1962 | Canada | 423/54 |
| 895402 | 5/1962 | United Kingdom | 423/54 |
| 1240524 | 7/1971 | United Kingdom | 423/54 |

OTHER PUBLICATIONS

"Amines as Extractants", Nuclear Science and Engineering, vol. 17, pp. 274–286, Coleman, D. F., 1963.
Investigation 6845, U.S. Department of the Interior, "Tungsten Recovery from Low-Grade Concentrates by Amine Solvent Extraction", P. E. Churchward et al., 1966, pp. 1–17.

Primary Examiner—Robert L. Stoll
Assistant Examiner—Paige C. Harvey
Attorney, Agent, or Firm—Donald R. Castle; L. Rita Quatrini

[57] ABSTRACT

A tungsten extraction process wherein tungsten values are extracted from an aqueous alkali metal tungstate solution by an organic solution containing an amine extractant wherein the organic solution consists essentially of from about 6% to about 10% by volume of said amine extractant, and the balance of said organic solution being an aromatic solvent consisting essentially of a mixture of alkyl benzenes wherein the alkyl benzenes have molecular weights of 120, 134, or 148 and the total number of carbon atoms in the alkyl chains attached to the benzene ring are either 3, 4, or 5, and thereafter the tungstate values are removed from the organic solution by stripping with aqueous ammonia, is improved by carrying out the stripping step in the aqueous continuous mode, and having as the stripping agent, an aqueous solution of ammonium metatungstate having a tungsten concentration which allows the strip solution to have a specific gravity of no greater than about 1.5, the stripping agent having sufficient ammonia to maintain the pH of the stripping agent at from about 5 to about 8, with the temperature of the stripping agent being no greater than room temperature.

3 Claims, No Drawings

PROCESS FOR RECOVERING TUNGSTEN FROM ORGANIC SOLUTIONS

BACKGROUND OF THE INVENTION AND REVIEW OF PRIOR ART

Extraction of tungsten by amines has been known for a number of years as reported by Coleman, D.F., et al., "Amines as Extractants", Nuclear Science and Engineering, Vol. 17, 274–286, 1963. C.R. Kurtak in U.S. Patent No. 3, 158,438, 1964, describes an integrated solvent extraction process using an amine. A long chain aliphatic alcohol is used as a phase conditioner (or solubilizer). P. Coad in U.S. Patent No. 3,804,941 describes tungsten recovery from an aqueous alkaline brine solution using a quaternary amine. Tungsten recovery from low grade concentrates containing low concentrations of tungsten using a primary amine and a quaternary amine is reported in Investigation 6845, U.S. Department of the Interior. A tricaprylyl amine, tributyl phosphate and kerosene system has also been used. A preferred kerosene is a material sold under the trade name of Kermac 470B by Kerr-McGee. In the above system tributyl phosphate is essential for the amine-tungsten complex to remain soluble in the organic extractant solution. Without tributyl phosphate the complex is insoluble and the systen cannot be operated. Generally a solution containing from about 10 to about 14 percent by volume of the tricaprylyl amine, from about 10 to about 14 percent by volume of tributyl phosphate and the balance kerosene is used. The tungsten is stripped from the organic by aqueous ammonia to form ammonium tungstate.

While the tricaprylyl amine-tributyl phosphate-kerosene system provides satisfactory recovery of tungsten it does have some disadvantages. In addition to the necessity of using tributyl phosphate to provide solubility for the amine-tungsten complex, sodium is extracted along with the tungsten. In addition, tributyl phosphate hydrolyzes to produce di-n-butyl phosphoric acid and mono-n-butyl phosphoric acid. These acids extract cationic impurities. It is also necessary in the above extraction system to add heat.

U.S. Pat. No. 4,175,109 describes a 2 component solvent extraction system consisting essentially of a tertiary amine dissolved in an aromatic solvent. This system is an improvement over the three phase system described above in that phase separation (disengagement) of organic and aqueous phases is greatly improved. Furthermore, there is increased throughput with this system and a product which is relatively sodium free.

In the above described systems, the tungsten is stripped from the organic by aqueous ammonia in an organic continuous dispersion to form ammonium tungstate. This ammonium tungstate is converted through evaporative heating to ammonium paratungstate (APT). For many applications, ammonium metatungstate, (AMT), is desired because it is a highly water soluble form of tungsten. In order to produce AMT, the APT is then roasted to drive off ammonia and/or water and is then digested to convert the APT to AMT. The resulting AMT solution is concentrated and solid AMT is crystallized from the solution. The steps of converting the ammonium tungstate via APT to AMT are labor intensive and therefore costly.

Therefore an improvement to the process which would result in direct conversion to AMT without first converting normal ammonium tungstate to APT would be highly desirable.

SUMMARY OF THE INVENTION

In accordance with one aspect of this invention, in a process wherein tungsten values are extracted from an aqueous alkali metal tungstate solution containing impurities by an organic solution containing an amine extractant wherein the organic solution consists essentially of from about 6% to about 10% by volume of said amine extractant, and the balance of said organic solution being an aromatic solvent consisting essentially of a mixture of alkyl benzenes wherein the alkyl benzenes have molecular weights of 120, 134, or 148 and the total number of carbon atoms in the alkyl chains attached to the benzene ring are either 3, 4, or 5, and thereafter the tungstate values are removed from the organic solution by stripping with aqueous ammonia, the improvement comprising carrying out the stripping step in the aqueous continuous mode, and having as the stripping agent, an aqueous solution of ammonium metatungstate having a tungsten concentration which allows the strip solution to have a specific gravity of no greater than about 1.5, the stripping agent having sufficient ammonia to maintain the pH of the stripping agent at from about 5 to about 8, with the temperature of the stripping agent being no greater than room temperature.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

By this invention an improvement is provided in a process for recovering tungsten by solvent extraction, with the improvement being carrying out the stripping step in the aqueous continuous mode, and having as the stripping agent, an aqueous solution of ammonium metatungstate having a tungsten concentration which allows the strip solution to have a specific gravity of no greater than about 1.5, the stripping agent having sufficient ammonia to maintain the pH of the stripping agent at from about 5 to about 8, with the temperature of the stripping agent being no greater than room temperature.

The organic solution contains an amine extracting agent in a concentration of from about 6% to about 10% by volume of the organic. The major portion of the amine extracting agent is a mixture of tri-alkyl amines having alkyl chains of about 6 to about 10 carbon atoms with tri-isooctyl amine being the major component in the mixture. Preferred sources of these systems are supplied by Sherex Chemical Company under the trade name of Adogen 381, and by Henkel Corporation, under the trade name of Alamine 308.

The balance of the organic is an aromatic solvent consisting essentially of a mixture of alkyl benzenes wherein the alkyl benzenes have molecular weights of 120, 134, or 148 and the total number of carbon atoms in the alkyl chains attached to the benzene ring are either 3, 4, or 5. Typical constituents include trimethyl benzene, ethyl benzene, dimethylethyl benzene, methylpropyl benzene, tetramethyl benzene, diethyl toluene, dimethylisopropyl benzene and the like. The material is sold under the trade name of SC#150 by Buffalo Solvents and Chemicals Corporation. In the 1972 edition of "Organic Solvents," a trade publication of Buffalo Solvents and Chemicals Corporation, SC# 150 is listed as having a boiling point range of from 180° C. to 210° C., a flash point of 151° F. and a specific gravity of about 0.891. As previously stated, the molecular weight of the alkyl benzenes contained in SC# 150 are 120, 134, or 148, thus the total carbon atoms in the alkyl chain attached to the benzene ring are either 3, 4, or 5.

From about 6 to about 10 percent by volume of the above amine extractant and the balance SC#150 can be used, although about 8% by volume is preferred. Lower than about 6 percent of the amines results in excessive processing time while greater than about 10% by volume does not improve results and adds costs to the extraction process and also insoluble heavy organic forms.

The extraction operation is preferably carried out as described in U.S. Patent 4,175,109 entitled, "Process for Extracting Tungsten From Alkali Metal Tungstate Solutions," issued November 20, 1979. That patent is hereby incorporated by reference.

The prior art stripping operation is carried out preferably according to U.S. Pat. No. 4,374,099, entitled "Recovery of Tungsten Values From Alkali Tungstate Solution by Solvent Extraction," issued Feb. 15, 1983. In that patent, the stripping agent is aqueous ammonia and the aqueous phase is dispersed in the organic phase. This is called the organic continuous mode.

The stripping process of this invention is different from the prior art process.

One improvement afforded by the present is that the stripping is carried out in the aqueous continuous mode. This means that the organic phase is dispersed in the aqueous phase. Determination of whether the system is organic continuous or aqueous continuous can be done by standard conductivity measurements on solutions. A system is considered to be in the organic continuous mode if the resistance measured is greater than about 100,000 ohms. A system is considered to be in the aqueous continuous mode if the resistance measured is less than about 100 ohms. A system that measures between these values is unstable and the phase disengagement is generally unsatisfactory. An aqueous continuous system is desired in the stripping operation because it is believed that in the aqueous continuous system the absorption of ammonia into the aqueous phase is facilitated resulting in more efficient stripping. In an organic continuous system, contact between the ammonia gas and the aqueous phase is limited. The aqueous continuous state is induced in the stripping system by adjusting the organic to aqueous phase to the proper volume ratio to give the required conductivity measurement for the aqueous continuous mode. Typically the volume of the aqueous phase should be equal to or greater than that of the organic phase.

Another improvement afforded by the present invention is having as the stripping agent a relatively dilute ammonium metatungstate (AMT) solution. By dilute is meant that the solution contains enough tungsten so that after the stripping is carried out and the tungsten is removed from the organic into the stripping agent, the specific gravity of the resulting tungsten containing strip solution is no greater than about 1.5 and preferably no greater than about 1.4. The pH of the AMT solution is maintained at from about 5 to about 8, and preferably from about 6.5 to about 7.5. At this pH range the stripped tungsten forms a chemical precurser form to the ammonium metatungstate form. In this pH range, the tungsten strip solution can be easily processed to produce either AMT or APT. The pH is maintained at these levels by introducing ammonia into the solution. This is done preferably by gassing with ammonia preferably about 5–10% by weight anhydrous ammonia in an inert gas such as nitrogen. It is critical that the temperature of the stripping agent be no greater than about room temperature in particular no greater than about 35° C. with from about 18° C. to about 23° C. being the preferred temperature. This temperature is critical because the energy level of the system must be kept low to keep the tungsten in the precurser form of the ammonium metatungstate species and to prevent formation of undesirable tungsten species such as normal ammonium tungstate.

The resulting strip solution contains the tungsten in the form of a precurser of ammonium metatungstate. This solution can now be processed by known methods which involve generally producing either ammonium metatungstate or ammonium paratungstate. Ammonium metatungstate is produced by adjusting the pH to from about 3 to about 4.5 by known methods, and concentration and crystallization to convert the precurser to the AMT product. Ammonium paratungstate (APT) is produced by adding ammonia and/or ammonium hydroxide to adjust the pH to from about 7 to 8 if necessary, and heating to precipitate the APT.

The improvement of this invention results in recovery of tungsten directly as a precurser of AMT which can then be easily converted to either AMT or APT as described above, as opposed to recovery of normal ammonium tungstate in the stripping step which must be first converted to APT before being converted to AMT.

To more fully illustrate this invention, the following nonlimiting example is presented. All parts, portions, and percentages are on a weight basis unless otherwise stated.

EXAMPLE

Aliquots of an organic consisting essentially of about 8% by volume of Alamine 308 as the tungsten extracting agent and SC#28 as the solvent and containing about 89 g $WO_3$/l are contacted with aliquots of an AMT strip solution containing about 18.8 g $WO_3$/l at a specific gravity of about 1.020. The pH of aliquots of the strip solution are at various values having been adjusted by gassing them with ammonia. The organic to aqueous volume ratios are at about 1 to 1. The stripping is carried out at a temperature of from about 23.7° C. to about 30.8° C. The amounts of tungsten that are stripped from the organics are given in the Table that follows.

TABLE

| pH of Strip Solution | g $WO_3$ in Strip Solutions | Specific Gravity of W Strip Solutions |
|---|---|---|
| 5.0 | 1.2 | 1.021 |
| 6.0 | 25 | 1.037 |
| 6.5 | 52 | 1.056 |
| 7.0 | 82 | 1.077 |
| 7.5 | 100 | 1.090 |

The pH of 7.5 is most favorable for efficient stripping of the tungsten. The tungsten containing strip solutions can be processed to produce either AMT or APT.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process wherein tungsten values are extracted from an aqueous alkali metal tungstate solution containing impurities by an organic solution containing an amine extractant wherein the organic solution consists essentially of from about 6% to about 10% by volume of said amine extractant, and the balance of said organic solution being an aromatic solvent consisting essentially of a mixture of alkyl benzenes wherein the alkyl benzenes have molecular weights of 120, 134, or 148, and the total number of carbon atoms in the alkyl chains attached to the benzene ring are either 3, 4, or 5, and thereafter the tungsten values are removed from the organic solution by contacting said organic solution with a stripping agent to form a tungsten containing strip solution, the improvement comprising carrying out the stripping step in an aqueous continuous mode, and having as the stripping agent, an aqueous solution formed from ammonium metatungstate, wherein said aqueous solution has a tungsten concentration which allows said tungsten containing strip solution to have a specific gravity of no greater than about 1.5, and sufficient ammonia to maintain the pH of said stripping agent at from about 5 to about 8, said stripping step being carried out with the temperature of said stripping agent being no greater than about 35° C. to produce a tungsten containing strip solution wherein the tungsten is in the form of a precurser of ammonium metatungstate.

2. An improvement of claim 1 wherein said pH is from about 6.5 to about 7.5.

3. An improvement of claim 1 wherein said temperature is from about 18° C. to about 23° C.

* * * * *